United States Patent Office 3,462,375
Patented Aug. 19, 1969

3,462,375
STABILIZING COMPOSITION FOR OLEFIN POLYMERS CONTAINING A HYDROCARBON-MERCAPTO-HYDROCARBON PHOSPHITE, CARBON BLACK, AND A HINDERED PHENOL
Harry Braus, Springdale, Ohio, and Jerome E. Hager, Decatur, and Lester A. Hill, Jr., Tuscola, Ill., assignors to National Distillers and Chemical Corporation, New York, N.Y., a corporation of Virginia
No Drawing. Continuation-in-part of application Ser. No. 519,415, Jan. 10, 1966. This application Oct. 20, 1966, Ser. No. 587,988
Int. Cl. B01j 1/18; C09k 3/00
U.S. Cl. 252—400        18 Claims

ABSTRACT OF THE DISCLOSURE

An olefin polymer stabilizer composition comprising in combination a hydrocarbon-mercapto-hydrocarbon phosphite, carbon black and optionally a hindered phenol.

---

This application is a continuation-in-part of application Ser. No. 519,415, filed Jan. 10, 1966 now abandoned This invention relates to compositions useful in the enhancement of the resistance of olefin polymers, such as ethylene polymers, to deterioration in physical properties due to heat, comprising a hydrocarbon-mercapto-hydrocarbon phosphite in combination with carbon black, and optionally, a hindered phenol, and to olefin polymer compositions having an enhanced resistance to heat deterioration, due to incorporation therein of such compounds, and to a process of enhancing the resistance of olefin polymers to heat deterioration.

Many of the most important applications of polyethylene such as its use in cable sheathings depend upon its superior physical properties, as evaluated by low temperature brittleness, tensile strength and abrasion resistance tests coupled with good water repellency. Other uses take advantage of its high dielectric strength in applications such as primary insulation of wire conductors.

Unfortunately, however, polymeric materials such as polyethylene are subject to deterioration in air and weather from sunlight, i.e., ultraviolet radiation, and heat, both of which induce oxidation of the polyethylene and thereby lead to increased brittleness at low temperatures and reduced tensile strength and dielectric properties.

In addition, when polyethylene is mechanically worked in the presence or absence of air at the elevated temperatures necessary for processing, molecular structure changes occur wherein the polymer becomes lower in tensile elongation, and the original electrical resistivity of the polymer at high and low frequencies becomes progressively poorer. At the same time, undesirable changes occur in both the viscous and elastic components of melt flow behavior. Furthermore, cross-linking occurs upon prolonged exposure of the polymer to ultraviolet radiation in the presence of air.

It is customary to incorporate small amounts of finely dispersed particles of carbon black into polyethylene to shield it from the deleterious degradative effects of ultraviolet radiation, and thereby enhance its resistance to light deterioration. Furthermore, many compounds, so-called thermal stabilizers or antioxidants, have been developed and incorporated as well, to enhance the resistance of polyethylene to thermal and oxidative degradation, such as various amines, diaryl mono-sulfides, phenolic compounds, organic phosphites, and the like.

In view of the knowledge that certain carbon blacks when incorporated into essentially saturated hydrocarbon polymers also act as a mild thermal stabilizer, it might be expected that the incorporation of known stabilizer into polymeric materials containing such carbon blacks would result in increased stability against thermally induced deterioration. It was discovered many years ago, however, that not only is the effect of the presence of such stabilizers and carbon black in the polymer not necessarily additive, but that the effectiveness of many stabilizers in the presence of carbon black can be and is reduced severalfold. In many instances the stabilizer is rendered completely ineffectual so that such a product has no more resistance against thermal or oxidative degradation than does a sample containing no stabilizer whatever. For a discussion of the reduction in activity of or complete ineffectiveness of many thermal antioxidants such as diphenyl-p-phenylenediamine or the hindered phenol, 2,2'-methylenebis-(4-methyl-6-t-butylphenol), in combination with carbon black, see Journal of Applied Polymer Science, vol. 1, pp. 37 to 42 and pp. 43 to 49 (1959).

A class of compounds has been discovered which when combined with carbon black in polyolefin compositions, such as polyethylene, produce compositions having an enhanced resistance to deterioration in physical properties due to exposure to heat, despite the presence of carbon black.

In accordance with the instant invention, a stabilizer system for polyolefins is provided consisting essentially of a hydrocarbon-mercapto-hydrocarbon phosphite in combination with carbon black, to improve resistance of the polyolefins to heat-induced deterioration, for long periods of time. Such a combination displays a surprising stabilizing action against heat-induced deterioration, in view of the presence of the carbon black, suggesting that each component synergizes the stabilizing action of the other. This is especially surprising in view of the fact that in combination with carbon black the effectiveness of most commercially available antioxidants is decreased.

The special properties of the hydrocarbon-mercapto-hydrocarbon phosphite-carbon black combination are enhanced when it is combined with a hindered phenol. The Journal of Applied Polymer Science article cited hereinbefore describes the deleterious effects that carbon black has on the hindered phenol, 2,2'-methylenebis(4-methyl-6-t-butyl phenol), which alone (without carbon black) gives good protection to polyethylene against heat-induced deterioration but which with carbon black is practically ineffective. In the presence of the hydrocarbon-mercapto-hydrocarbon phosphite, however, the combination of the carbon black with the hindered phenol not only does not destroy the effectiveness of the phenol but synergizes the effectiveness thereof, so that the three component combination is more effective than any of the components or pairs of components thereof, taken separately. This is a surprising result, that could not have been predicted even from the effectiveness of the combination of carbon black and hydrocarbon-mercapto-hydrocarbon phosphite.

Thus, also in accordance was the instant invention, a preferred composition of the invention is provided, consisting essentially of a combination of a hydrocarbon-mercapto-hydrocarbon phosphite, carbon black, and a hindered phenol, which combination is more effective than any of the components or pairs of components thereof in enhancing the resistance of olefin polymers, such as ethylene polymers, to deterioration in physical properties upon exposure to heat.

In addition, in accordance with the instant invention, olefin polymer compositions are provided, such as ethylene polymer compositions, consisting essentially of the olefin polymer in combination with a hydrocarbon-mercapto-hydrocarbon phosphite and carbon black, and preferably consisting essentially of the olefin polymer in hindered, i.e., substituted in both positions ortho to the combination with the hydrocarbon-mercapto-hydrocarbon phosphite, carbon black and a hindered phenol.

Further, in accordance with the instant invention a process for enhancing the resistance of olefin polymers, such as ethylene polymers, to deterioration of physical properties upon exposure to heat is provided, which comprises incorporating in the olefin polymer a combination of a hydrocarbon-mercapto-hydrocarbon phosphite and carbon black, and preferably a combination of the hydrocarbon-mercapto-hydrocarbon phosphite, carbon black and a hindered phenol.

The hydrocarbon-mercapto-hydrocarbon phosphites in accordance with the invention can be defined by the formula:

in which at least one of the X radicals is $R_1—(S—A)_n$ and the others can be hydrogen, an organic radical, $R_2$, having from one to thirty carbon atoms, or $R_1—(S—A)_n$. Accordingly, the hydrocarbon-mercapto-hydrocarbon phosphite of the invention can be a mono-, di-, or tri-substituted mercapto neutral or acid phosphite, although the tri-substituted neutral phosphite containing three R—S—A groups is preferred. Furthermore, a mixture of mono-, di- and/or tri-substituted neutral or acid phosphites can be employed herein. A is an alkylene or alicyclene or arylene or a mixed alkylene-alicyclene or alkylene-arylene group in any combination, having a straight or branched chain, whose total number of carbon atoms ranges from one to eighteen, n is one to four, and R is an organic radical and can be selected from the group consisting of aryl, alkyl, cycloalkyl, aralkyl, alkaryl, alkoxy, aryloxy, and heterocyclic groups, in any combinations. Usually, the phosphite will not have more than about sixty carbon atoms.

As typical R radicals there can be mentioned methyl, ethyl, propyl, isopropyl, butyl, sec-butyl, tert-butyl, isoamyl, hexyl, octyl, isooctyl, 2-ethyl hexyl, nonyl, tetradecyl, octadecyl, lauryl, decyl, palmityl, stearyl, oleyl, benzyl, α- and β-phenethyl, xylyl, tolyl, naphthyl, cyclopentyl, cyclohexyl, cyclodecyl, furyl, tetrahydrofurfuryl, thienyl, methoxy, ethoxy, propoxy, isopropoxy, 2-ethyl hexyloxy, decyloxy, dodecyloxy, benzyloxy, phenoxy and the like.

A can be a single bond, as in diphenyl, or a bivalent group, such as:

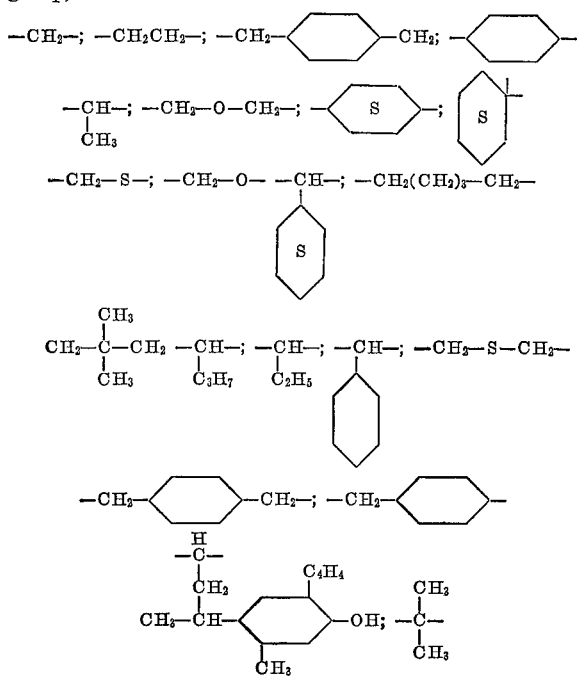

Examples of mono-substituted mercapto phosphites suitable for use herein include, but are not limited to, mono- β-laurylthioethyl phosphite,
mono-isooctylthio-tert-butyl phosphite,
mono-diphenylthiomethyl phosphite,
mono-2-ethyl-hexylthioethyl phosphite,
mono-tolylthio-α-methyl-ethylphosphite,
mono-cyclohexylthiomethyl phosphite,
mono-decylthio-decyl phosphite,
mono-methoxy thioethyl phosphite.

Examples of di-substituted mercapto phosphites suitable for use herein include, but are not limited to, di-(2-ethylhexylthioethyl) phosphite,
(ethyl)-(mono-2-ethylhexylthioethyl) phosphite,
(mono-methylthioethyl) (mono-isooctyl-thioethyl) phosphite,
(methyl) (mono-isooctylthioethyl) phosphite,
(mono-phenylthioethyl) (mono-2-ethylhexylthiomethyl) phosphite,
(2-ethylhexyl) (mono-phenylthioethyl) phosphite,
di(phenylthioethyl) phosphite,
di-cyclohexylthiomethyl) phosphite,
(monophenylthiononyl) (monotolylthio α-methyl ethyl) phosphite,
di(decylthiododecyl) phosphite,
(decyl) (mono-decylthiododecyl) phosphite,
di(benzylthiostearyl) phosphite,
di(palmitylthio α-methyl ethyl) phosphite and
di(methoxythioethyl) phosphite.

Preferably, the trisubstituted mercapto phosphite is tri (β-laurylthioethyl) phosphite. Other suitable tri-phosphites include, but are not limited to, tri(isooctylthio butyl) phosphite, (monophenylthioethyl) (di-2-ethylhexylthioethyl)phosphite, (2 - ethylhexyl diphenylthiomethyl) phosphite, (isopropyl) (di-isooctylthiomethyl) phosphite, (di-isooctylthiomethyl) (monotolylthio α-methyl ethyl) phosphite, tri(2-ethyl-hexylthioethyl) phosphite, (phenyl thioethyl) (dicyclohexyl thioethyl) phosphite, tri(phenylthiononyl) phosphite, (nonyl diphenylthiomethyl) phosphite, tri(decyl-thiodecyl) phosphite, tri(benzylthiostearyl) phosphite, tri(palmitylthio α-methylethyl) phosphite, tri-(methoxylthioethyl) phosphite, tri(phenylthioethyl) phosphite, tri(4-tert butylphenylthioethyl) phosphite, and tri(2-methyl-4-tert-butylphenylthioethyl) phosphite.

The terms "mercapto" and "thio" are used interchangeably herein.

The hydrocarbon-mercapto-hydrocarbon phosphites can be prepared by known procedures which form no part of the instant invention. Thus, for example, they can be readily prepared by reaction of the appropriate α,ω-alkylene chlorohydrin to form a thio-alcohol which is subsequently transesterified using triphenyl phosphite plus sodium ethylate to form the corresponding hydrocarbon-mercapto-hydrocarbon phosphite.

These are known reactions and form no part of the instant invention. Furthermore, the reaction product can be composed of a mixture of mono-, di- and/or tri-substituted neutral or acid phosphites, which as indicated hereinbefore, can also be employed in the instant invention.

Carbon black suitable for use herein includes both activated or unactivated types, such as channel carbon black, furnace carbon black, animal or vegetable carbon black, thermal carbon black, light lamp blacks, acetylene blacks and the like, and carbon blacks activated in the presence of such materials as oxygen, sulfur or selenium. The average particle size of carbon black used herein should be below about 1000 angstroms, and preferably below about 200 angstroms, so as to ensure the obtention of a uniform dispersion of the carbon black through the polymer.

The phenols which can be used herein should be hydroxyl group, and can contain from about eight to about 300 carbon atoms. Such phenols can be monocyclic or polycyclic, and monohydric or polyhydric.

The hindered monocyclic phenols which can be employed have the structure:

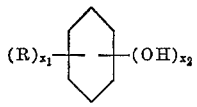

R is selected from the group consisting of halogen; and organic radicals containing from one to about thirty carbon atoms, such as alkyl, aryl, alkenyl, alkaryl, aralkyl, cycloalkenyl, cycloalkyl, alkoxy, aryloxy and acyl

where R' is aryl, alkyl or cycloalkyl.

$x_1$ is an integer from two to four, and $x_2$ is an integer from one to four, and the sum of $x_1$ and $x_2$ does not exceed six. The monocyclic phenol containing one or more hydroxyl groups should be substituted in both positions ortho to each hydroxyl group.

Polycyclic phenols include aromatic nuclei which are linked by a bivalent linking radical, and are defined by the formula:

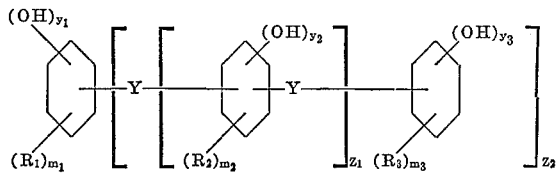

wherein $R_1$, $R_2$ and $R_3$ are inert substituent groups of the type of R above, Y is a bivalent linking radical, and is selected from the group consisting of oxygen atoms or an alkylene or alicyclene or arylene or a mixed alkylene-alicyclene or mixed alkylene-arylene groups having a straight or branched chain, whose total number of carbon atoms ranges from one to about eighteen. $m_1$ is an integer from one to a maximum of $5-(z_2+y_1)$; $m_2$ can be an integer from zero to three; and $m_3$ an integer from one to four; $z_1$ can be an integer from zero to about six, and $z_2$ an integer from one to five, preferably one or two. Preferably, the hydroxyl groups in polycyclic phenols are located ortho and/or para to Y. There can be from one to four hydroxyl groups per phenyl nucleus, $y_1$, $y_2$ and $y_3$ representing the numbers thereof, each phenyl nucleus being substituted in both positions ortho to each hydroxyl group. Preferably, there will be only one hydroxyl group per phenyl nucleus.

Y can be a single bond, as in diphenyl, or a bivalent group, such as:

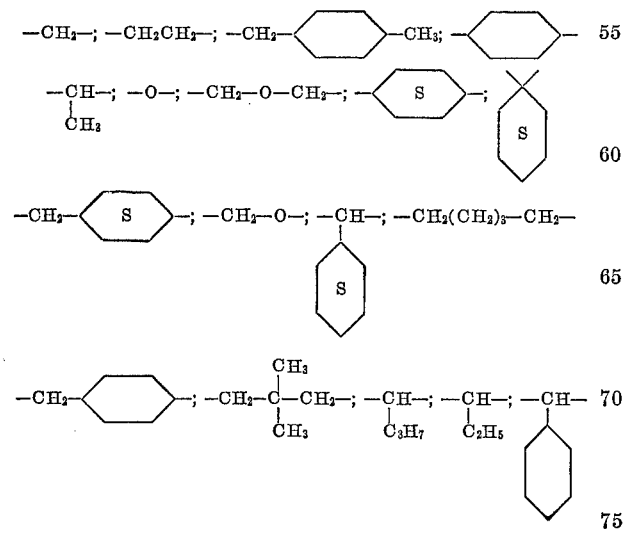

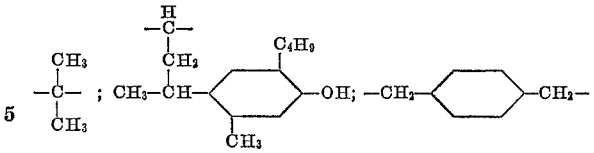

Representative phenols include 2,6-di-tert-butyl-4-methyl phenol, 2-tert-butyl-6-methoxy phenol, 2,6-dinonyl phenol, 2,3,4,6-tetradecyl phenol, 2-isopropyl-6-dodecyl phenol, 2-methyl-6-octyl phenol, 2-hexyl-6-n-decyloxy phenol, 2-nonyl-3-methyl-6-n-decyloxy phenol, and 2 - nonyl - 6 - benzyloxyphenol, 2,6-di-tert-butyl-2-methoxy-p-cresol (Antioxidant 762) and 3,5-di-tert-butyl-4-hydroxybenzyl ether.

Exemplary polyhydric monocyclic phenols are: 2-ethyl-4-octyl-6-methyl resorcinol, 2-dodecyl-4-methyl-6-nonyl-resorcinol, 2 - methyl-4-isooctyl-6-dodecyl-phloroglucinol, 2,4,6-tri-tert-butyl resorcinol, and 2,4,6-triisopropyl phloroglucinol.

Exemplary polyhydric polycyclic phenols are 2,2'-methylenebis (6-tert-butyl-phenol), 2,2'-methylene-bis (4-methyl-6-tert-butyl-phenol) (Cyanamid 2246), 4,4'-methylene - bis(2,6-di-tert-butyl-phenol) (Ethyl Antioxidant 712 or Ionox 220), 2,2'-methylene-bis(4-ethyl-6-tert-butyl-phenol) (Cyanamid 162), 4,4'-methylene-bis(6-tert butyl-o-cresol) (Ethyl Antioxidant 220), 4,4'-oxobis (2-methyl-6-isopropyl phenol), 2,2'-oxobis(6-dodecyl phenol), 4,4' - n-butylidenebis(2-tert-butyl-6-methylphenol), 4,4' - benzylidenebis(2-tert-butyl-6-methylphenol), 4,4'-cyclohexylidenebis(2,6-di - tert - butyl phenol), 1,3,5-trimethyl - 2,4,6 - tris(3,5-di-tert-butyl-4-hydroxy benzyl benzene) (Ionox 330), 2,2'-methylenebis(4-methyl-6-(1'-methyl - cyclohexyl)-phenol), 2,6-bis(2'-hydroxy-3'-tert-butyl - 5' - methylbenzyl)-4-methylphenol, 1,1,3-tris(2'-methyl-4'-hydroxy-5'-tert-butylphenyl)butane and $\alpha^2,\alpha^6$-bis(3-tert-butyl-5-methyl-2-hydroxy-phenyl)-mesitol.

The preferred stabilizer system of the invention comprises two or three stabilizers, the hydrocarbon-mercapto-hydrocarbon phosphite and carbon black, and optionally a hindered phenol. These two and three stabilizers together can display a stabilizing effectiveness which is not depressed by the carbon black, and which can exceed that obtainable from any of them alone, or in combinations of two. On the other hand, however, when the hindered phenol alone is employed with carbon black, the hindered phenol loses almost all of its antioxidant effectiveness, and accordingly the synergistic result using the three component combination is especially unexpected. This enhanced stabilizing effect is obtained with any olefin polymer, regardless of the process by which it is prepared.

A sufficient amount of the stabilizer combination of the invention is used to enhance the resistance of the olefin polymer against deterioration in physical properties, including, for example, resistance to embrittlement upon exposure to heat under the conditions to which the polymer will be subjected. Small amounts are usually adequate. Amounts of the hydrocarbon-mercapto-hydrocarbon phosphite within the range from about 0.002 to about 0.5% by weight of the olefin polymer and amounts of carbon black within the range from about 0.2 to about 5% by weight of the olefin polymer are satisfactory. For many polyethylene applications, carbon black concentrations of up to about 50% can be present, especially where partially conductive polyolefin-carbon black compounds are employed. Preferably, from about 0.05 to about 0.15% of the hydrocarbon-mercapto-hydrocarbon phosphite and from about 2 to about 3% of the carbon black are employed for optimum enhancement of resistance to heat deterioration.

The hindered phenol can be used in quantities as low as about 0.002%, and as high as about 0.5% by weight of the olefin polymer, and preferably in amounts from about 0.02 to about 0.1% by weight of the olefin polymer.

The two component combinations of stabilizers of the invention will generally contain from about 0.05 to about 0.15% of the hydrocarbon-mercapto-hydrocarbon phosphite, and from about 0.3 to about 3.0% of the carbon black. The three component combinations in addition include from about 0.02 to about 0.1% of the hindered phenol, by weight of the combination.

Other thermal stabilizers can be employed in the compositions of the present invention such as organic hydrocarbon phosphites, thiodipropionic acid esters, polyvalent metal salts of organic acids, organic polysulfides, aminophenols, and the like. Light stabilizers can be employed in the composition of the instant invention such as various 2-hydroxybenzophenones, thiosalicyclates and the like.

Conventional additives such as fillers, pigments, and plasticizers can also be present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

The stabilizer of the invention is applicable to olefin polymers prepared by any of the various procedures, using the available catalysts, such as the Ziegler, ICI, Union Carbide, Du Pont, Phillips, Montecatini, Esso and Standard Oil (Indiana) process polymers (Chem. & Eng. News, Nov. 21, 1960, pp. 36–59), inasmuch as the molecular weight and tacticity are not factors affecting this stabilizer.

Formerly, olefin polymers prepared by these processes contained traces of catalyst residues. These residues materially diminished the stability of the olefin polymer, despite efforts to overcome the problems by addition of polyvinyl chloride resin stabilizers, whose function was to act on the halogen or halide of the catalyst in the same manner as on the halogen or liberated halide of the polyvinyl chloride resin. It is now customary to remove catalyst residues substantially completely, so that the addition of polyvinyl chloride resin stabilizers is no longer indicated. The stabilizers of the invention are effective with olefin polymers substantially free from catalyst residues, although they can also be used with catalyst-containing polymers with good results.

The stabilizer of the invention is particularly applicable to ethylene homopolymers, which include normally solid low or high molecular weight homopolymers obtained from ethylene. Such polymers usually have a molecular weight of at least 6,000 and preferably a molecular weight of 20,000 to 45,000 or more. They have a waxy feel, and when examined by the X-ray diffraction technique exhibit the presence of a crystalline phase.

Mixtures of ethylene homopolymers with other compatible polymers, and copolymers of ethylene with copolymerizable monomers such as styrene, vinyl chloride, vinyl acetate, vinylidene chlorofluoride and methyl methacrylate which are not reactive with the stabilizer combination, the ethylene polymer or copolymer being present in a sufficient amount, usually a major amount, i.e. about 85% weight or more, to present the stabilization problem resolved by the invention, also can be stabilized. The term "ethylene polymer" as used herein includes, accordingly, homopolymers such as low or high density polyethylene, and Ziegler polyethylene and ethylene copolymers, and mixtures of ethylene homopolymers, as discussed above.

The stabilizers of the invention can also be used with other olefin polymers, such as polypropylene, poly(butene-1), poly(pentene-1), poly(3-methyl butene-1), poly-4-methyl-pentene-1, and polystyrene.

The term "olefin polymer" encompasses both homopolymers and copolymers, as well as mixtures of olefin polymers.

The stabilizer is incorporated in the polymer in suitable mixing equipment, such as a mill, a Banbury mixer, an extruder and the like. If the ethylene polymer has a melt viscosity which is too high for the desired use, the ethylene polymer can be worked until its melt viscosity has been reduced to the desired range, before addition of the stabilizer. The resulting mixture is then removed from the mixing equipment, and brought to the size and shape desired, for marketing or use.

The stabilized olefin polymer can be worked into the desired shape, such as by milling, calendering, extrusion, or injection molding or fiber-forming.

The term "consisting essentially of," as used herein, means that the ingredients recited in the specification and claims are the essential ingredients of the composition of the invention and no others are employed which would be undesirable in the enhancement of the resistance of olefin polymers to deterioration in physical properties due to exposure to heat.

The following examples in the opinion of the inventors represent the best embodiments of their invention.

Example 1

The two-component hydrocarbon-mercapto-hydrocarbon phosphite-carbon black stabilizer system of the invention was evaluated for the stabilizing effect of each component thereof, taken singly, and in a pair, in enhancing the resistance of polyethylene to deterioration in physical properties due to exposure to heat. The stabilizers used were tri(β-laurylthioethyl)phosphite and carbon black, in the form of channel carbon black having an average particle size of about 20 A. Stabilizers were weighed and dispersed in previously unstabilized polyethylene (NH 323), melt index 0.15 ASTM D1238–62T at 190° C., using a two-pound laboratory Banbury mixer. The mixture was placed in a cold roll mill and was flattened and the crepe produced cut to convenient size for subsequent tests. Table I below sets forth the stabilizers contained in each of the various samples of polyethylene prepared. Although Control Sample A did not contain stabilizers or carbon black it was subjected to the same preparatory mixing as the other samples.

TABLE I

| Stabilizer System | Samples | | | |
|---|---|---|---|---|
|  | A | B | C | D |
| Carbon black, percent | | 2.5 | | 2.5 |
| Tri(β-laurylthioethyl)phosphite, percent | | | 0.1 | 0.1 |

The effectiveness of this stabilizer system of the invention in inhibiting increase in melt index (Test A), while maintaining good tensile properties, as evaluated by tensile strength, tensile yield strength, and tensile elongation (Test B), and maintaining good dielectric constant and dissipation factor (Test C) after heat ageing, shows the degree of heat stabilization imparted by the compounds of the invention. All of the above tests were carried out on small samples, which were exposed to prolonged roll milling conducted at 320° F. for various times up to and including 6 hours, or oven ageing at 100° C. for various times up to and including 292 hours.

Test A.—Melt index

The tri(β-laurylthioethyl)phosphite-carbon black stabilizer combination of the invention was evaluated for its inhibiting effect on rate of increase in melt index of polyethylene. Samples were prepared as described and were oven aged or roll milled for various times. Portions of each sample were then submitted to a melt index determination using the ASTM D1238–62T procedure at 190° C. Table II below tabulates the results obtained for the various Samples A to D by showing the flow rate (grams/10 minutes) of the heat aged samples for each ageing time. The effect on rate of flow of the polyethylene samples over the various ageing times corresponds to the effect on melt index over the same ageing periods and thus is an accurate measure of resistance to heat deterioration imparted by the stabilizer added to the polymer.

TABLE II

[Melt Index (g./10 min.)]

| Sample | No Ageing | Oven Aged (at 100° C.) | | | Minutes on 320° F. Roll Mill Before Test | | | | | | | | |
|---|---|---|---|---|---|---|---|---|---|---|---|---|---|
| | | 72 hrs. | 146 hrs. | 292 hrs. | 5 | 10 | 30 | 60 | 90 | 120 | 180 | 240 | 360 |
| A (unstabilized polyethylene) | 0.23 | 0.08 | 0.12 | 17.7 | 0.09 | 0.05 | (*) | .004 | (*) | 0.07 | 0.08 | 0.10 | 0.04 |
| B (polyethylene and carbon black) | 0.16 | 0.16 | 0.15 | 0.20 | 0.16 | 0.16 | 0.16 | 0.16 | 0.17 | 0.17 | _____ | 0.26 | 0.22 |
| C (polyethylene and tri(β-laurylthioethyl)phosphite) | 0.14 | 0.13 | 0.11 | 0.11 | 0.11 | 0.09 | 0.24 | 0.28 | 0.10 | 0.15 | 0.21 | 0.08 | 0.08 |
| D (polyethylene tri(β-laurylthioethyl)phosphite and carbon black) | 0.16 | 0.15 | 0.14 | 0.15 | 0.16 | 0.18 | 0.18 | 0.19 | 0.17 | 0.18 | 0.18 | 0.24 | 0.25 |

*No flow.

The effectiveness of the stabilizer system of the invention (Sample D) in inhibiting change in melt index is evident from the data of Table II.

Test B.—Tensile properties

The tri(β-laurylthioethyl)phosphite-carbon black stabilizer system of the invention was evaluated for its effect on tensile strength, tensile yield strength, and tensile elongation using testing procedure specified in ASTM D1248–63T.

The data obtained is reported in Tables III, IV and V below.

The results tabulated in Tables III, IV and V clearly show that this stabilizer composition of the invention enhanced the resistance of polyethylene against decrease in tensile strength, decrease in tensile yield strength and decrease in tensile elongation due to heat ageing.

Test C.—Dielectric properties

The dielectric constant (using testing procedure ASTM D1531–62) and dissipation factor (using testing procedure ASTM D1531–62) of Samples A to D were measured after various periods of heat ageing and the data obtained is reported in Tables VI and VII respectively.

TABLE III

[Tensile Strength (p.s.i.) at Break]

| Sample | No Ageing | Oven Aged (100° C.) | | | Roll Milled (320° F.) | | | | | |
|---|---|---|---|---|---|---|---|---|---|---|
| | | 72 hrs. | 146 hrs. | 292 hrs. | 1 hr. | 2 hrs. | 3 hrs. | 4 hrs. | 5 hrs. | 6 hrs. |
| A (unstabilized polyethylene) | 1,890 | 1,490 | 1,230 | 1,350 | 1,530 | 1,420 | 1,420 | 1,390 | 1,330 | 1,390 |
| B (polyethylene and carbon black) | 1,980 | 1,890 | 1,870 | 1,880 | 1,680 | _____ | 1,750 | 1,770 | 1,710 | 1,780 |
| C (polyethylene and tri(β-laurylthioethyl) phosphite) | 2,040 | 1,860 | 1,760 | 1,660 | 1,640 | 1,420 | 1,450 | 1,340 | 1,410 | 1,310 |
| D (polyethylene tri(β-laurylthioethyl)phosphite and carbon black) | 1,980 | 1,760 | 1,830 | 1,770 | 1,960 | 2,040 | 1,920 | 1,900 | 2,040 | 1,920 |

TABLE IV

[Tensile Yield Strength p.s.i.]

| Sample | No Ageing | Oven Aged (100° C.) | | | Roll Milled (320° F.) | | | | | |
|---|---|---|---|---|---|---|---|---|---|---|
| | | 72 hrs. | 146 hrs. | 292 hrs. | 1 hr. | 2 hrs. | 3 hrs. | 4 hrs. | 5 hrs. | 6 hrs. |
| A (unstabilized polyethylene) | 1,400 | 1,490 | 1,450 | 1,640 | 1,530 | 1,460 | 1,420 | 1,400 | 1,390 | 1,430 |
| B (polyethylene and carbon black) | 1,400 | 1,590 | 1,530 | 1,500 | 1,470 | _____ | 1,470 | 1,450 | 1,440 | 1,440 |
| C (polyethylene and tri(β-laurylthioethyl)phosphite) | 1,350 | 1,460 | 1,470 | 1,480 | 1,410 | 1,390 | 1,410 | 1,380 | 1,410 | 1,340 |
| D (polyethylene, tri(β-laurylthioethyl)phosphite and carbon black) | 1,480 | 1,500 | 1,560 | 1,590 | 1,500 | 1,510 | 1,500 | 1,530 | 1,520 | 1,350 |

TABLE V

[Tensile Elongation at Break (%)]

| Sample | No Ageing | Oven Aged (100° C.) | | | Roll Milled (320° F.) | | | | | |
|---|---|---|---|---|---|---|---|---|---|---|
| | | 72 hrs. | 146 hrs. | 292 hrs. | 1 hr. | 2 hrs. | 3 hrs. | 4 hrs. | 5 hrs. | 6 hrs. |
| A (unstabilized polyethylene) | 550 | 475 | 270 | 135 | 260 | 230 | 370 | 380 | 250 | 225 |
| B (polyethylene and carbon black) | 570 | 540 | 550 | 610 | 480 | _____ | 550 | 500 | 490 | 500 |
| C (polyethylene and tri(β-laurylthioethyl)-phosphite) | 610 | 600 | 560 | 600 | 500 | 420 | 410 | 310 | 310 | 290 |
| D (polyethylene, tri(β-laurylthioethyl)phosphite and carbon black) | 580 | 540 | 560 | 580 | 500 | 540 | 520 | 540 | 540 | 580 |

TABLE VI
[Dielectric Constant (100 k.c.)]

| Sample | No Ageing | Oven Aged (100° C.) 146 hrs. | Oven Aged (100° C.) 292 hrs. | Roll Milled (320° F.) 3 hrs. | Roll Milled (320° F.) 6 hrs. |
|---|---|---|---|---|---|
| A (unstabilized polyethylene) | 2.316 | 2.433 | 2.73 | 2.390 | 2.436 |
| B (polyethylene and carbon black) | 2.522 | 2.520 | 2.536 | 2.509 | 2.507 |
| C (polyethylene and tri($\beta$-laurylthioethyl)phosphite) | 2.319 | 2.328 | 2.323 | 2.366 | 2.415 |
| D (polyethylene, tri($\beta$-laurylthioethyl)phosphite and carbon black) | 2.536 | 2.526 | 2.551 | 2.508 | 2.501 |

TABLE VII
[Dissipation Factor (100 k.c.)]

| Sample | No Ageing | Oven Aged (100° C.) 146 hrs. | Oven Aged (100° C.) 292 hrs. | Roll Milled (320° F.) 3 hrs. | Roll Milled (320° F.) 6 hrs. |
|---|---|---|---|---|---|
| A (unstabilized polyethylene) | 0.0014 | 0.0053 | 0.0092 | 0.0028 | 0.0042 |
| B (polyethylene and carbon black) | 0.0016 | 0.0015 | 0.0018 | 0.0015 | 0.0015 |
| C (polyethylene and tri($\beta$-laurylthioethyl)phosphite) | 0.0014 | 0.0015 | 0.0002 | 0.0025 | 0.0037 |
| D (polyethylene, tri($\beta$-laurylthioethyl)phosphite and carbon black) | 0.0018 | 0.0017 | 0.0019 | 0.0016 | 0.0012 |

The data clearly show that the two-component stabilizer composition of the instant invention enhanced the resistance of polyethylene against degradation in dielectric properties due to exposure to heat.

Example 2

The three-component stabilizer system of the invention, namely the hydrocarbon mercapto hydrocarbon phosphite, carbon black and hindered phenol combination, was evaluated for its stabilizing effect on polyethylene, using Tests A to C described in Example 1, against the two-component combination of the invention which does not contain the hindered phenol, and against a commercially available phenolic antioxidant alone or in combination with carbon black, in enhancing the resistance of polyethylene to deterioration in physical properties due to exposure to heat. The stabilizers used were tri($\beta$-laurylthioethyl)phosphite, carbon black (as in Example 1) and the hindered phenol, 4,4'-methylene bis (2,6-di-tert-butyl phenol) and as the commercially available antioxidant, 4,4'-thiobis(2-tert-butyl-5-methyl phenol).

In addition, the three-component stabilizer system of the invention was evaluated for its stabilizing effect on polyethylene in improving resistance of polyethylene to embrittlement at low temperatures (Test D).

The samples were prepared as described in Example 1 and then were oven aged at 100° C. for various times up to and including 292 hours, or were exposed to prolonged roll milling conducted at 320° F. for various times up to and including 6 hours.

The three component stabilizer system of the invention was evaluated for its stabilizing effect on polyethylene in improving resistance of polyethylene to changes in physical and chemical condition as detected by differential thermal analysis (Test E). Two different apparatus were employed in this test, namely the Perkin Elmer Differential Scanning Calorimeter and the Du Pont 900 DTA equipped with a 900 250 time base accessory.

Table VIII below sets forth the stabilizers contained in each of the various samples of polyethylene prepared.

TABLE VIII
[In Percent]

| Stabilizer System | D | E | F | Control 1 | Control 2 | Control 3 | Control 4 | Control 5 | Control 6 | Control 7 |
|---|---|---|---|---|---|---|---|---|---|---|
| Carbon Black | 2.5 | 2.5 | 2.6 | | 2.5 | | 2.6 | | | 2.6 |
| Tri($\beta$-laurylthioethyl)phosphite | 0.1 | 0.1 | 0.1 | | | | | 0.1 | | |
| 4,4'-methylenebis(2,6-di-tert-butyl phenol) | | 0.05 | 0.05 | | | | | | 0.05 | |
| 4,4'-thiobis(2-tert-butyl-5-methyl phenol) | | | | 0.1 | 0.1 | | | | | 0.1 |

Samples D, E and Controls 1 and 2 were submitted to Tests A to C as described in Example 1. The results of these tests follow.

Test A.—Melt index

As seen from the results in Table IX below, the use of the hindered phenol in the three-component combination of Sample E did not destroy the stabilizing effectiveness of the other two components, tri($\beta$-laurylthioethyl)phosphite, and carbon black in inhibiting increase in melt index.

TABLE IX
[Melt Index (g./10 min.)]

| Sample | No ageing | Oven Aged (at 100° C.) 72 hrs. | Oven Aged (at 100° C.) 146 hrs. | Oven Aged (at 100° C.) 292 hrs. | Minutes on 320° F. Roll Mill Before Test 5 | 10 | 30 | 60 | 90 | 120 | 180 | 240 | 360 |
|---|---|---|---|---|---|---|---|---|---|---|---|---|---|
| D (polyethylene, carbon black and tri($\beta$-laurylthioethyl)phosphite) | 0.16 | 0.15 | 0.14 | 0.15 | 0.16 | 0.18 | 0.18 | 0.19 | 0.17 | 0.18 | 0.18 | 0.24 | 0.25 |
| E (polyethylene, carbon black, tri($\beta$-laurylthioethyl)phosphite and 4,4'-methylenebis(2,6-di-tert-butyl phenol)) | 0.23 | 0.17 | 0.15 | 0.16 | 0.16 | 0.15 | 0.18 | 0.19 | 0.19 | 0.21 | 0.23 | 0.22 | 0.31 |
| Control 1 (4,4'-thiobis (2-tert-butyl-5-methyl phenol)) | 0.22 | 0.19 | 0.20 | 0.24 | 0.23 | 0.25 | 0.22 | 0.24 | 0.23 | 0.24 | 0.26 | 0.28 | 0.37 |
| Control 2 (4,4'-thiobis (2-tert-butyl-5-methyl phenol) and carbon black) | 0.16 | 0.16 | 0.15 | 0.16 | 0.18 | 0.19 | 0.24 | 0.20 | 0.18 | 0.19 | 0.20 | 0.21 | 0.28 |

Test B.—Tensile properties

With regard to the results of the tensile properties tests, it is readily seen in Table X that the three-component stabilizer combination of the invention which includes the hindered phenol (Sample E), is superior to the two-component combination of the invention (Sample D), in enhancing the resistance of polyethylene to reduction in tensile elongation upon exposure to heat. Accordingly, this shows the hindered phenol enhanced the effectiveness of the two-component combination. In addition, it is seen from the data of Control 2 that the addition of carbon black to the commercially available thiobisphenol of Control 1 adversely affected the stabilizing effectiveness of the thiobisphenol in enhancing the resistance of polyethylene to reduction in tensile elongation when oven aged at 100° C. for various times.

TABLE X

[Tensile Elongation at Break (percent)]

| Sample | No Ageing | Oven Aged (100° C.) | | | Roll Milled (320° F.) | | | | | |
|---|---|---|---|---|---|---|---|---|---|---|
| | | 72 hrs. | 146 hrs. | 292 hrs. | 1 hr. | 2 hrs. | 3 hrs. | 4 hrs. | 5 hrs. | 6 hrs. |
| D (polyethylene, carbon black and tri($\beta$-laurylthioethyl) phosphite) | 580 | 540 | 560 | 580 | 500 | 540 | 520 | 540 | 540 | 580 |
| E (polyethylene, carbon black, tri($\beta$-laurylthioethyl)phosphite and 4,4'-methylenebis(2,6-di-tertbutyl phenol)) | 610 | 630 | 630 | 640 | 600 | 550 | 590 | 520 | 610 | 620 |
| Control 1 (4,4'-thiobis(2-tert-butyl-5-methylphenol)) | 610 | 620 | 630 | 620 | 600 | 550 | 580 | 560 | 600 | 630 |
| Control 2 (4,4'-thiobis(2-tert-butyl-5-methylphenol) and carbon black) | 580 | 570 | 580 | 570 | 600 | 620 | 600 | 620 | 550 | 620 |

The data set forth in Tables XI and XII show that the presence of the hindered phenol in the stabilizer combination of the invention (Sample E) had no substantial deleterious effect on the stabilizing effectiveness of the hydrocarbon - mercapto - hydrocarbon phosphite-carbon black combination (Sample D) in enhancing the resistance of polyethylene to reduction in tensile strength and tensile yield strength due to exposure to heat.

The results set forth in Table XIV below show that the inclusion of the hindered phenol in the stabilizer composition of the invention (Sample E) did not adversely effect the stabilizing effectiveness of the two-component stabilizer composition of the invention (Sample D) in enhancing the resistance of polyethylene to degradation in dissipation factor.

TABLE XI

[Tensile Strength (p.s.i.) at Break]

| Sample | No Ageing | Oven Aged (100° C.) | | | Roll Milled (320° F.) | | | | | |
|---|---|---|---|---|---|---|---|---|---|---|
| | | 72 hrs. | 146 hrs. | 292 hrs. | 1 hr. | 2 hrs. | 3 hrs. | 4 hrs. | 5 hrs. | 6 hrs. |
| D (polyethylene, carbon black and tri($\beta$-laurylthioethyl) phosphite) | 1,980 | 1,760 | 1,830 | 1,770 | 1,960 | 2,040 | 1,920 | 1,900 | 2,040 | 1,920 |
| E (polyethylene, carbon black, tri($\beta$-laurylthioethyl)phosphite and 4,4'-methylenebis(2,6-di-tert butyl phenol)) | 1,980 | 1,940 | 1,940 | 2,050 | 2,000 | 1,820 | 1,870 | 1,820 | 1,910 | 1,960 |
| Control 1 (4,4'-thiobis(2-tert-butyl-5-methyl phenol)) | 1,980 | 1,980 | 1,930 | 1,740 | 1,900 | 1,800 | 1,980 | 1,880 | 1,910 | 2,010 |
| Control 2 (4,4'-thiobis(2-tert-butyl-5-methyl phenol) and carbon black) | 1,990 | 1,910 | 1,820 | 1,750 | 1,950 | 2,000 | 1,980 | 1,930 | 1,830 | 2,930 |

TABLE XII

[Tensile Yield Strength (p.s.i.)]

| Sample | No Ageing | Oven Aged (100° C.) | | | Roll Milled (320° F.) | | | | | |
|---|---|---|---|---|---|---|---|---|---|---|
| | | 72 hrs. | 146 hrs. | 292 hrs. | 1 hr. | 2 hrs. | 3 hrs. | 4 hrs. | 5 hrs. | 6 hrs. |
| D (polyethylene, carbon black and tri($\beta$-laurylthioethyl) phosphite) | 1,480 | 1,500 | 1,560 | 1,590 | 1,500 | 1,510 | 1,500 | 1,530 | 1,520 | 1,350 |
| E (polyethylene, carbon black, tri($\beta$-laurylthioethyl)phosphite and 4,4'-methylenebis(2,6-di-tertbutyl phenol)) | 1,390 | 1,540 | 1,500 | 1,580 | 1,480 | 1,300 | 1,380 | 1,310 | 1,380 | 1,380 |
| Control 1 (4,4'-thiobis(2-tert-butyl-5-methyl phenol)) | 1,380 | 1,480 | 1,470 | 1,480 | 1,376 | 1,350 | 1,370 | 1,360 | 1,350 | 1,320 |
| Control 2 (4,4'-thiobis(2-tert-butyl-5-methylphenol) and carbon black) | 1,450 | 1,520 | 1,520 | 1,550 | 1,500 | 1,500 | 1,490 | 1,490 | 1,500 | 1,490 |

Test C.—Dielectric properties

The results of Table XIII below show that the addition of the hindered phenol to the two-component combination of the invention enhanced the stabilizing effectiveness of the hydrocarbon-mercapto-hydrocarbon phosphite-carbon black combination in enhancing the resistance of polyethylene to degradation in dielectric constant. Furthermore, the results of Control 2 clearly show that the addition of carbon black to the commercially available antioxidant, (Control 1) adversely affected its stabilizing effectiveness.

TABLE XIII

Dielectric Constant (100 kc.)

| Samples | No ageing | Oven Aged (100° C.) | | Roll Milled (320° F.) | |
|---|---|---|---|---|---|
| | | 146 hrs. | 292 hrs. | 3 hrs. | 6 hrs. |
| D (polyethylene, carbon black and tri($\beta$-laurylthioethyl)-phosphite) | 2.536 | 2.526 | 2.551 | 2.508 | 2.501 |
| E (polyethylene, carbon black, tri($\beta$-laurylthioethyl)-phosphite and 4,4'-methylenebis(2,6-di-tert-butyl phenol)) | 2.510 | 2.51 | 2.516 | 2.480 | 2.483 |
| Control 1 (4,4'-thiobis(2-tert-butyl-5-methyl phenol)) | 2.317 | 2.325 | 2.320 | 2.317 | 2.318 |
| Control 2 (4,4'-thiobis(2-tert-butyl-5-methyl phenol) and carbon black) | 2.543 | 2.561 | 2.558 | 2.505 | 2.507 |

TABLE XIV

Dissipation Factor (100 kc.)

| Sample | No ageing | Oven Aged (100° C.) | | Roll Milled (320° F.) | |
|---|---|---|---|---|---|
| | | 146 hrs. | 292 hrs. | 3 hrs. | 6 hrs. |
| D (polyethylene, carbon black and tri($\beta$-laurylthioethyl)-phosphite) | 0.0018 | 0.0017 | 0.0019 | 0.0016 | 0.0012 |
| E (polyethylene, carbon black, tri($\beta$-laurylthioethyl)phosphite and 4,4'-methylenebis(2,6-di-tert-butyl phenol)) | 0.0020 | 0.0020 | 0.0021 | 0.0016 | 0.0017 |
| Control 1 (4,4'-thiobis(2-tert-butyl-5-methyl phenol)) | 0.0017 | 0.0016 | 0.0014 | 0.0017 | 0.0017 |
| Control 2 (4,4'-thiobis(2-tert-butyl-5-methyl phenol) and carbon black) | 0.0021 | 0.0021 | 0.0020 | 0.0018 | 0.0017 |

Test D—Low temperature brittleness

Samples A, B, C, E and Controls 1 and 2 were evaluated for their effectiveness in improving resistance of polyethylene to embrittlement at −76° C. using ASTM D–746–64T testing procedure and the failures per 10 specimens tested for each of various times of heat ageing were recorded in Table XV below.

TABLE XV

[Low Temperature Brittleness at −76° C. Number of Failures/10 Specimens]

| Sample | No Ageing | Oven Aged (100° C.) | | | Roll Milled (320° F.) | |
|---|---|---|---|---|---|---|
| | | 72 hrs. | 146 hrs. | 292 hrs. | 3 hrs. | 6 hrs. |
| A (unstabilized polyethylene) | 1/10 | | | 10/10 | 7/10 | 10/10 |
| B (polyethylene and carbon black) | 2/10 | 2/10 | 3/10 | 2/10 | 0/10 | 0/10 |
| C (Polyethylene and tri(β-laurylthioethyl)phosphite) | 0/10 | 1/10 | 4/10 | 2/10 | 2/10 | 7/10 |
| E (Polyethylene, carbon black, tri(β-laurylthioethyl)phosphite and 4,4′-methylenebis(2,6-di-tert-butylphenol)) | 0/10 | 0/10 | 0/10 | 1/10 | 1/10 | 0/10 |
| Control 1 (4,4′-thiobis(2-tert-butyl-5-methyl phenol)) | 0/10 | 0/10 | 1/10 | 0/10 | 1/10 | 0/10 |
| Control 2 (4,4′-thiobis(2-tert-butyl-5-methyl phenol) and carbon black) | 0/10 | 7/10 | 6/10 | 9/10 | 1/10 | 0/1 |

The data indicated that the three-component stabilizer combination of the invention (Sample E), was superior in stabilizing effectiveness to either the carbon black (Sample B) or tri(β-laurylthioethyl)-phosphite (Sample C). The results of Control 2 indicated that the addition of carbon black to the commercially available antioxidant, i.e. the unhindered thiobisphenol of Control 1, completely destroyed the stabilizing effectiveness of this unhindered thiobisphenol in enhancing the resistance of polyethylene to low temperature brittleness.

Test E.—Differential thermal analysis

The tri(β-laurylthioethyl) phosphite-carbon black-4,4′-methylenebis(2,6-di-tert-butyl phenol) combination of the invention was evaluated for its inhibiting effect on changes in physical and chemical condition of polyethylene undergoing differential thermal analysis.

In one test method, the Perkin Elmer Differential Scanning Calorimeter was employed. This apparatus is equipped with a recorded which records the heat or energy changes in the samples undergoing testing as a function of time (chart speed). When a noticeable break appears in the trace recorded, this indicates that the sample has undergone a change in condition. The samples tested were in the form of discs prepared as follows. Film was pressed from the resin at a temperature of 125° C. and a pressure of 30 p.s.i. Film discs were cut from the film, the discs having a diameter of about ¼ inch and a thickness ranging from about 2 to about 3 mils. The discs were introduced into the calorimeter cell and heated from a temperature of 37° C. to a temperature of about 200° C., at a rate of 80° C./min. in an atmosphere of nitrogen. When the temperature reached 200° C., the nitrogen was replaced by oxygen flowing at a rate of 5 ml./min. and the recorder was at that time started. When a noticeable break appeared in the trace, the induction time was obtained from the chart speed which was set at 12 inches per hour. Table XVI below tabulates the results obtained for the various Sample F, and Controls 3 to 7, by showing the induction time in minutes for each sample. The reported induction times are only relative since they are affected by the size, shape, and thickness of the sample, cell geometry, and the rate of oxygen flow over the surface.

The anti-oxidant induction times of the Sample F and Controls 3 to 7 compositions were also determined by using a Du Pont 900 DTA apparatus equipped with a 900 250 time base accessory. The Du Pont apparatus contains a recorder which measures temperature as a function of time (chart speed). The apparatus was used as follows. 0.2 g. pellet samples were placed in a 4 mm. diameter sample tube and inserted in the apparatus. Nitrogen gas was flowed at a rate of 30 ml./min. over the surface of the sample while the sample was heated to 200° C. Thereafter, the nitrogen was replaced by oxygen flowing at a rate of 30 ml./min. and the recorder started. When a noticeable break appeared in the trace, the induction time was obtained from the chart speed which was set at 0.1 in./min. The results obtained for each sample were recorded in Table XVI below.

TABLE XVI

| Sample | Induction Times | |
|---|---|---|
| | Perkin Elmer Differential Scanning Calorimeter | DuPont 900 DTA |
| F (tri(β-laurylthioethyl)phosphite, carbon black and 4,4′-methylenebis(2,6-di-tert-butyl phenol)) | 50 | 113.5 |
| Control 3 (no stabilizer) | 3 | 16 |
| Control 4 (carbon black alone) | 5 | 12.0 |
| Control 5 (tri(β-laurylthioethyl)phosphite alone) | <1 | |
| Control 6 (4,4′-methylenebis(2,6-di-tert-butyl phenol) alone) | 8 | 37 |
| Control 7 (carbon black and 4,4′-thiobis(2-tert-butyl-5-methyl phenol)) | 50 | 136.5 |

As seen from the results in Table XVI above, the three component stabilizing combination of the instant invention was very effective in inhibiting a change in state of the polyethylene undergoing differential thermal analysis. The induction times obtained using the Perkin Elmer apparatus were much shorter than that obtained with the Du Pont apparatus. The difference in induction times can be explained from the differences in the type of samples used in each apparatus, the cell geometry, and the rate of flow of oxygen over the sample surface in each apparatus. From the data, it is seen that the three component stabilizer combination of the invention was substantially as effective as the combination of the carbon black and the commercially available thiobisphenol of Control 7. Furthermore, it is clearly seen that the three component stabilizer combination of the invention was substantially more effective as a stabilizer than the individual components thereof in inhibiting change of state of the polyethylene undergoing differential thermal analysis.

Examples 3 to 8

The two and three-component stabilizer systems of the invention were evaluated for their stabilizing effect on polyethylene in improving resistance of polyethylene to changes in physical and chemical condition as detected by differential thermal analysis using the Du Pont 900 DTA equipped with a 900 250 time base accessory, described in Example 2.

The samples were prepared as described in Examples 1 and 2.

Table XVII below sets forth the stabilizers contained in each of the various samples of polyethylene prepared and the results obtained.

TABLE XVII

| Ingredients | Control | | Example No. | | | | | |
|---|---|---|---|---|---|---|---|---|
| | 3 | 4 | 3 | 4 | 5 | 6 | 7 | 8 |
| Polyethylene | 100 | 100 | 100 | 100 | 100 | 100 | 100 | 100 |
| Tri(4-tert-butylphenylthioethyl)phosphite | | | 0.1 | | | 0.1 | | |
| Tri(2-methyl-4-tert-butylphenylthioethyl)phosphite | | | | 0.1 | | | 0.1 | |
| Tri(phenylthioethyl)phosphite | | | | | 0.1 | | | 0.1 |
| Carbon black | | 2.6 | 2.6 | 2.6 | 2.6 | 2.6 | 2.6 | 2.6 |
| 4,4′-methylenebis(2,6-di-tert butylphenol) | | | | | | 0.05 | 0.05 | 0.05 |
| Induction Times (min.) using DuPont 900 DTA | 16 | 12 | 19 | 22 | 26 | 145 | 167 | 103 |

As seen from the results in Table XVII, the two- and three-component stabilizing combinations of the invention were very effective in inhibiting a change in condition of the polyethylene undergoing differential thermal analysis.

Examples 9 to 17

In Examples 9 to 17, various hydrocarbon-mercapto-hydrocarbon phosphites in combination with carbon black of the type used in Example 1 are incorporated into samples of polyethylene in a manner similar to that described in Example 1. The samples are oven aged at 100° C. and exposed to prolonged roll milling at 320° F. as described in Example 1.

The stabilizers and amounts that are incorporated into the polyethylene are set forth in Table XVIII below.

TABLE XVIII

| Example No. | Mercapto Phosphite and Amount | Carbon black amount, percent |
|---|---|---|
| 9 | Tri(isooctylthiobutyl)phosphite, 0.1% | 2.5 |
| 10 | Mono(phenylthioethyl)di(2-ethylhexylthioethyl)phosphite, 0.1% | 2.5 |
| 11 | Di(chclohexylthiomethyl)phosphite, 0.1% | 2.5 |
| 12 | Mono-β-laurylthioethyl phosphite, 0.1% | 2.5 |
| 13 | Di(methoxythillethyl)phosphite, 0.1% | 2.5 |
| 14 | Tri(phenylthiononyl)phosphite, 0.1% | 2.5 |
| 15 | Tri(phenylthioethyl)phosphite | 2.5 |
| 16 | Tri(4-tert-butylphenylthioethyl)phosphite | 2.5 |
| 17 | Tri(4-tert-butyl-2-methylphenyl thioethyl)phosphite | 2.5 |

RESULTS.—Each combination has good stability after it is heat aged in an oven for various times up to 292 hours at 200° C. and after it is exposed to roll milling at 320° F. for various times up to 6 hours.

Examples 18 to 26

In Examples 18 to 26, three-component stabilizer systems of the invention containing hydrocarbon-mercapto-hydrocarbon phosphites used in Examples 9 to 17, with various hindered phenols and carbon black are added to samples of polyethylene as described in Examples 1 and 2. The samples are oven aged at 100° C. and exposed to prolonged roll milling at 320° F. as described in Example 1.

The stabilizers and amounts that are incorporated into the polyethylene are set forth in Table XIX below.

TABLE XIX

| Example No. | Mercapto Phosphite and Amount. | Carbon Black Amount, percent | Hindered Phenol and Amount |
|---|---|---|---|
| 18 | Tri(isooctylthiobutyl)phosphite, 0.1% | 2.5 | 4,4'-methylenebis(6-tert-butyl-o-cresol), 0.05%. |
| 19 | Mono(phenylthioethyl)di(2-ethylhexylthioethyl)phosphite, 0.1%. | 2.5 | 2,2'-methylenebis(6-tert-butylphenol), 0.05%. |
| 20 | Di(cyclohexylthiomethyl)phosphite, 0.1% | 2.5 | 3,5-di-tert-butyl-4 hydroxybenzyl ether, 0.05%. |
| 21 | Mono-β-laurylthioethylphosphite, 0.1% | 2.5 | 2-ethyl-4-octyl-6-methylresorcinol, 0.05%. |
| 22 | Di(methoxythioethyl)phosphite, 0.1% | 2.5 | 1,3,5-tri-methyl-2,4,6-tris(3,5-di-tert-butyl-4-hydroxybenzyl)benzene, 0.05%. |
| 23 | Tri(phenylthiononyl)phosphite, 0.1% | 2.5 | 4,4'-cyclohexylidenebis(2,6-di-tert-butyl phenol), 0.05%. |
| 24 | Tri(phenylthioethyl)phosphite | 2.5 | 2,2'-methylenebis(4-ethyl-6-tert-butyl phenol), 0.05%. |
| 25 | Tri(4-tert-butylphenylthioethyl)phosphite | 2.5 | 4,4'-methylenebis(2,6-di-tert-butyl phenol), 0.05%. |
| 26 | Tri(2-methyl-4-tert-butylphenylthioethyl)phosphite | 2.5 | 4,4'-n-butylidenebis(2-tert-6-methyl phenol), 0.05 %. |

RESULTS.—Each combination has good stability after it is heat aged in an oven for various times up to 292 hours at 100° C. and after it is exposed to roll milling at 320° F. for various times up to 6 hours.

Having regard to the foregoing disclosure, the following is claimed as the inventive and patentable embodiments thereof:

1. An olefin polymer stabilizer combination capable of enhancing the resistance of olefin polymers to deterioration in physical properties due to exposure to heat, consisting essentially of a hydrocarbon-mercapto-hydrocarbon phosphite having the formula:

in which at least one of the X radicals is $R_1-(S-A)_n$ and the others are selected from the group consisting of hydrogen, $R_2$ and $R_1-(S-A)_n$, wherein $R_1$ and $R_2$ are organic radicals having from about one to about thirty carbon atoms, selected from the group consisting of alkyl, cycloalkyl, aryl, aralkyl, alkaryl, alkenyl, cycloalkenyl, alkoxy, aryloxy, and heterocyclic radicals, $n$ is one to four and A is selected from the group consisting of alkylene, alicyclene, arylene mixed alkylene-alicyclene, and mixed alkylene-arylene groups, and carbon black, each present in an amount to enhance the stabilizing effect of the other.

2. An olefin polymer stabilizer combination in accordance with claim 1 wherein the hydrocarbon-mercapto-hydrocarbon phosphite is tri(β-laurylthioethyl) phosphite.

3. An olefin polymer stabilizer combination in accordance with claim 1 wherein the hydrocarbon-mercapto-hydrocarbon phosphite is tri(isooctylthio-tert-butyl) phosphite.

4. An olefin polymer stabilizer combination in accordance with claim 1 wherein the hydrocarbon-mercapto-hydrocarbon phosphite is (monophenylthioethyl) (di-2-ethylhexylthioethyl) phosphite.

5. An olefin polymer stabilizer combination in accordance with claim 1 wherein the hydrocarbon-mercapto-hydrocarbon phosphite is tri(2-ethylhexylthioethyl) phosphite.

6. An olefin polymer stabilizer combination in accordance with claim 1 wherein the hydrocarbon-mercapto-hydrocarbon phosphite is di(cyclohexylthiomethyl) phosphite.

7. An olefin polymer stabilizer combination in accordance with claim 1 wherein the hydrocarbon-mercapto-hydrocarbon phosphite is tri(phenylthioethyl) phosphite.

8. An olefin polymer stabilizer combination in accordance with claim 1 wherein the hydrocarbon-mercapto-hydrocarbon phosphite is tri(4-tert-butylphenylthioethyl) phosphite.

9. An olefin polymer stabilizer combination in accordance with claim 1 wherein the hydrocarbon-mercapto-hydrocarbon phosphite is tri(2-methyl-4-tert-butylphenylthioethyl) phosphite.

10. An olefin polymer stabilizer combination in accordance with claim 1 including in addition an amount sufficient to enhance the stabilization of an olefin polymer of a hindered phenol having the formula:

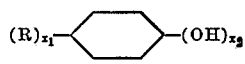

wherein R is an organic radical containing from one to about thirty carbon atoms selected from the group consisting of alkyl, aryl, alkenyl, alkaryl, aralkyl, cycloalkenyl, cycloalkyl, alkoxy, aryloxy and acyl; $x_1$ is an integer from two to four; $x_2$ is an integer from one to four; and the sum of $x_1$ and $x_2$ does not exceed six; or

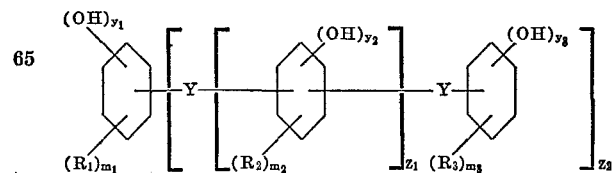

wherein $R_1$, $R_2$ and $R_3$ are organic radicals containing from one to about thirty carbon atoms selected from the group consisting of alkyl, aryl, alkenyl, arkaryl, aralkyl, cycloalkenyl, cycloalkyl, alkoxy, aryloxy and acyl groups, Y is selected from the group consisting of oxygen, alkylene, alicyclene, arylene, and mixed alkylene-arylene and alkylene-alicyclene groups, $m_1$ is an integer from one to a maximum of $5-(z_2+y_1)$, $m_2$ is zero to three, $m_3$ is one to about four, $z_1$ is one to about five, and $y_1$, $y_2$ and $y_3$ are at least one.

11. An olefin polymer stabilizer combination in accordance with claim 10 wherein the hydrocarbon-mercaptohydrocarbon phosphite is tri(phenylthioethyl) phosphite.

12. An olefin polymer stabilizer combination in accordance with claim 10 wherein the hydrocarbon-mercaptohydrocarbon phosphite is tri(4-tert-butylphenylthioethyl) phosphite.

13. An olefin polymer stabilizer combination in accordance with claim 10 wherein the hydrocarbon-mercaptohydrocarbon phosphite is tri(2-methyl-4-tert-butylphenylthioethyl) phosphite.

14. An olefin polymer stabilizer combination in accordance with claim 10 wherein the hindered phenol has the formula:

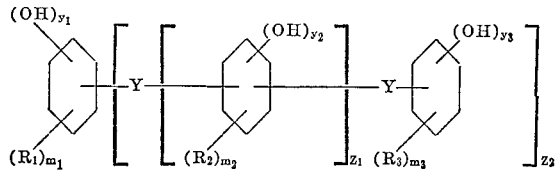

wherein $R_1$, $R_2$ and $R_3$ are organic radicals containing from one to about thirty carbon atoms selected from the group consisting of alkyl, aryl, alkenyl, aralkyl, cycloalkenyl, cycloalkyl, alkoxy, aryloxy and acyl groups, Y is selected from the group consisting of oxygen, alkylene, alicyclene, arylene, and mixed alkylene-arylene and alkylene-alicyclene groups, $m_1$ is an integer from one to a maximum of $5-(z_2+y_1)$, $m_2$ is zero to three, $m_3$ is one to about four, $z_1$ is one to about five, and $y_1$, $y_2$ and $y_3$ are at least one.

15. An olefin polymer stabilizer combination in accordance with claim 14 wherein the hindered phenol is 4,4'-methylenebis-(2,6-di-tert-butyl-phenol).

16. An olefin polymer stabilizer combination in accordance with claim 14 wherein the hindered phenol is 4,4'-methylenebis(6-tert-butyl-o cresol).

17. An olefin polymer stabilizer combination in accordance with claim 14 wherein the hindered phenol is 2,2'-methylenebis(6-tert-butyl phenol).

18. An olefin polymer stabilizer combination in accordance with claim 14 wherein the hydrocarbon-mercaptohydrocarbon phosphite is tri($\beta$-laurylthioethyl) phosphite and the hindered phenol is 4,4'-methylene-bis(2,6-di-tert-butyl phenol).

References Cited

UNITED STATES PATENTS

| | | | |
|---|---|---|---|
| 2,587,616 | 3/1952 | Harman | 260—30.6 X |
| 3,043,775 | 7/1962 | Coffield et al. | 252—404 X |
| 3,115,465 | 12/1963 | Orloff et al. | 252—400 X |
| 3,244,650 | 4/1966 | Hecker et al. | 252—404 X |

OTHER REFERENCES

Bevilacqua, E. M., J. American Chemical Society, 1959, p. 5071.

LEON D. ROSDOL, Primary Examiner

I. GLUCK, Assistant Examiner

U.S. Cl. X.R.

252—404, 406; 260—30.6, 949